United States Patent [19]

Robbins et al.

[11] 3,914,450

[45] Oct. 21, 1975

[54] CONCENTRATED EXTRACT OF YEAST AND PROCESSES OF MAKING SAME

[75] Inventors: Ernest Aleck Robbins, High Ridge; Robert William Sucher, St. Louis County; Robert Dudley Seeley, Crestwood; Erich Henry Schuldt, Jr., St. Louis County; Jon Albert Newell, Webster Groves; Daniel Robert Sidoti, Ballwin, all of Mo.

[73] Assignee: Anheuser-Busch, Incorporated, St. Louis, Mo.

[22] Filed: Apr. 9, 1973

[21] Appl. No.: 349,316

[52] U.S. Cl............... 426/533; 260/112 R; 426/655
[51] Int. Cl.²... A23J 1/18; A23L 1/28; A23L 1/231
[58] Field of Search............ 426/204, 65, 364, 478; 260/112 R

[56] References Cited
UNITED STATES PATENTS

| | | | |
|---|---|---|---|
| 3,268,412 | 8/1966 | Champagnat et al. | 195/3 |
| 3,634,194 | 1/1972 | Frankenfeld et al. | 195/28 N |
| 3,681,195 | 8/1972 | Suekane et al. | 195/4 |
| 3,725,075 | 4/1973 | Muroi et al. | 99/14 |
| 3,778,513 | 12/1973 | Shiga et al. | 426/7 |

*Primary Examiner*—James R. Hoffman
*Attorney, Agent, or Firm*—Gravely, Lieder & Woodruff

[57] ABSTRACT

This application discloses a yeast extract comprising on a dry solids basis 40–55% crude protein (N × 6.25); 7–14% nucleic acid; 0.5–1.5% lipid; 17–27% ash; and 10–35% carbohydrate. The glutamic acid residues comprise 27–40% of the corrected protein. The extract has a neutral flavor. When the extract is cooked at a pH of 3–7, a temperature of 80°–100°C., for 2–16 hours, and concentrated to at least about 70% solids, it has a roast meat flavor. The neutral flavored extract enhances the flavor of soups and the meat flavored extract can be used in brown gravies, beef bouillon, etc.

On a moisture free and ash free basis the composition is 52–71% crude protein, 9–18% nucleic acid, 0.7–2% lipid, and 15–45% carbohydrate.

12 Claims, 1 Drawing Figure

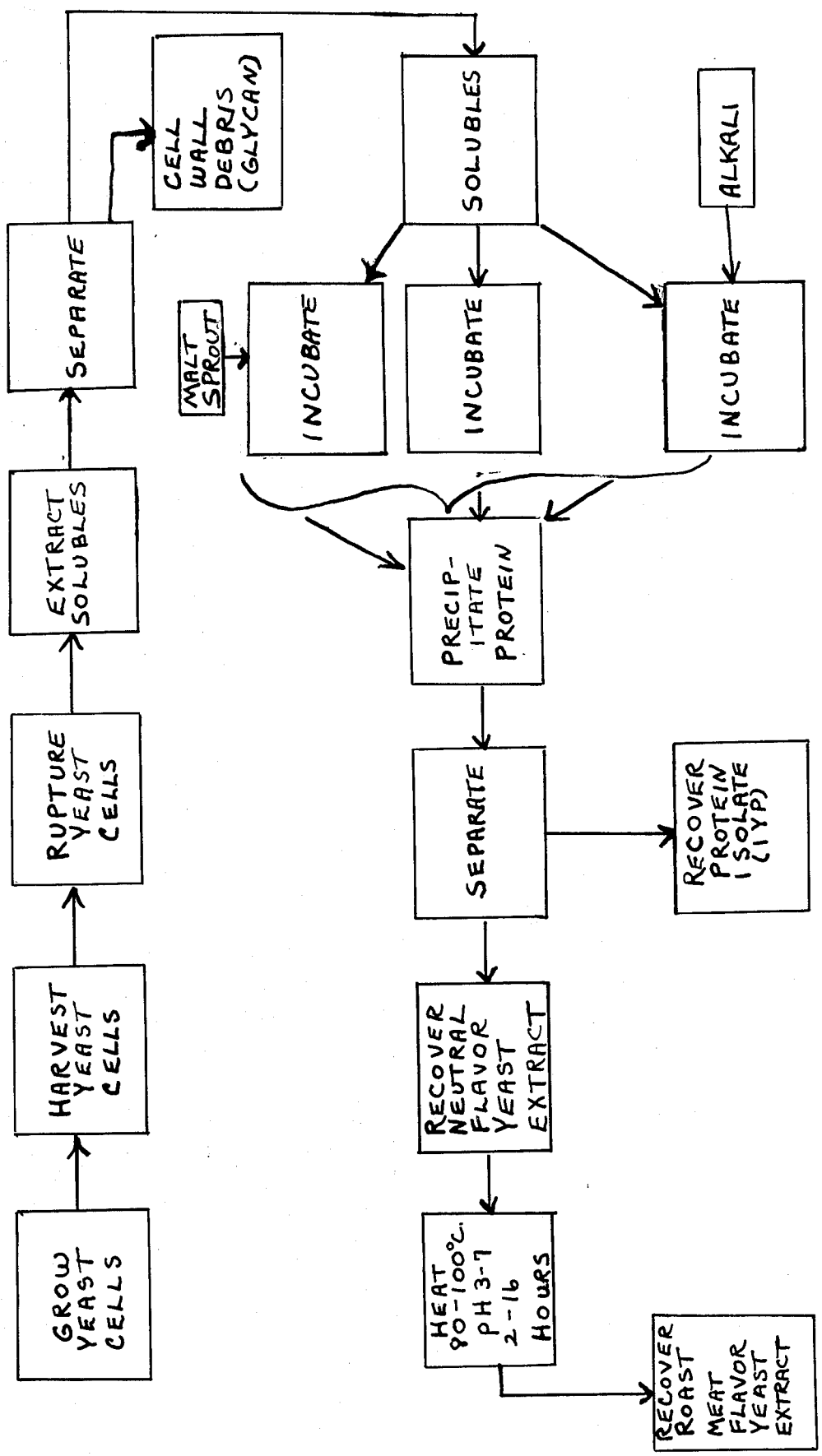

CONCENTRATED EXTRACT OF YEAST AND PROCESSES OF MAKING SAME

REFERENCE TO PRIOR APPLICATIONS

This application contains subject matter in common with co-pending applications Ser. Nos. 310,452, now U.S. Pat. No. 3867554; 310,453, now U.S. Pat. No. 3867555; 310,455; 310,468, now U.S. Pat. No. 3867255 and 310,469 all filed on Nov. 29, 1972 in the names of one or more of the following inventors: Ernest Aleck Robbins; Robert William Sucher, Robert Dudley Seeley; Jon Albert Newell; Erich Henry Schuldt, Jr., and Daniel Robert Sidoti.

BACKGROUND OF THE INVENTION

Extracts of yeast have long been used as a source of flavor. Extracts of yeasts are sometimes classified into autolysates, plasmolysates, or hydrolysates, according to their method of preparation. Hydrolysates are prepared by the controlled cooking of yeast in acid solution. Plasmolysates are prepared by extracting the cellular materials from the yeast cell with high concentrations of salt, sugar, or certain acetate esters. Autolysates are prepared by inducing the self-digestion of the cytoplasmic materials in the whole cell followed by recovery of the solubilized material. The trade literature of yeast extract uses the term "autolyzed yeast extract". In any event, the yeast extracts of commerce contain digestion products of protein and nucleic acids as well as low molecular weight peptides, amino acids, nitrogen bases, nucleosides, and nucleotides that are normally present as parts of metabolic pools of the cytoplasm.

The process described in this application involves the recovery of useful products from a by product produced by the processes defined in applications Ser. Nos. 310,452; 310,453; 310,468; and 310,469. In all of the processes described in the aforesaid applications, a separation of the yeast protein from the cell walls of the yeast is achieved. Ser. No. 310,452 describes the cell wall fraction or yeast glycan fraction. This is a valuable food product. Ser. No. 310,469 describes an isolated yeast protein fraction and one method of making said yeast protein using nuclease present in the yeast (endogenous nuclease) to solubilize the nucleic acid prior to separating it from the protein. Ser. Nos. 310,468 and 310,453 describe other processes for solubilizing the nucleic acid prior to separating it from the protein. All of the processes produce low nucleic acid yeast protein and a usable cell wall fraction. In addition, these processes all produce a yeast extract from which the products of this invention are obtained. This extract is characterized by high nucleic acid content and a high content of glutamic acid residues.

Nucleic acids are precursors of the flavor enhancing mononucleotides. Also, as mentioned, the glutamic acid residues present in the cytoplasmic materials are recovered in the solubles (extract), and glutamic acid too is a flavor enhancer.

The mild process conditions and short processing time allow the recovery of the solubles in a form essentially free of meaty flavors, but, under the proper processing conditions, these solubles are converted to meat flavored solubles. Thus, this invention can be used to produce a neutral flavored extract and a meat flavored extract. Both extracts have the same composition characteristics which distinguish them from known yeast extract, namely a high nucleic acid content and high glutamic acid residues.

SUMMARY OF THE INVENTION

This invention comprises a yeast extract high in nucleic acid content and high in glutamic acid residues. The invention further comprises processes for making a neutral flavored yeast extract and a meat flavored yeast extract of the foregoing composition.

DESCRIPTION OF THE DRAWING

The drawing is a schematic flow sheet of the entire process of this invention.

DETAILED DESCRIPTION

When yeast cells are ruptured by any method, a cellular debris fraction and a soluble cytoplasmic fraction are obtained. These fractions can be separated by centrifugation or filtration. The soluble cytoplasmic fraction contains all of the constituents of the yeast cell except the cell wall component which is the cellular debris. That is, the soluble cytoplasmic fraction contains high molecular weight protein, nucleic acid, fat, and carbohydrate, as well as the low molecular weight constituents of the metabolic pools such as amino acids, peptides, nucleotides, nucleosides, nitrogen bases, glycolytic pathway intermediates, vitamins, minerals, and the like. Under the proper processing conditions, the majority of the protein and fat become insoluble, and are removed by centrifugation or filtration. The minority of the protein, the majority of the nucleic acid, part of the carbohydrate, and all of the constituents of the metabolic pools remain in the soluble fraction, which is known by us as "yeast extract" or "acid whey".

In practice, yeast cells are produced by methods known to those versed in the art. The microbial biomass is harvested by centrifugation or filtration. In this application, the term "biomass" means living yeast cells. The biomass is water washed, and dilute alkali may be incorporated in the wash to remove adhering color and taste bodies.

The microbial cells are ruptured by any of the several known methods, such as high pressure homogenization, attrition in a sand or colloid mill, sonic disintegration, repeated freeze-thaw cycles, lytic enzymes, and the like. The most important factor is to rupture a majority of the cells under conditions such that : (a) the cell walls can be removed, (b) the endogenous nuclease is not destroyed, (c) the majority of the protein can be removed, and (d) no off-flavors are introduced. The presently preferred method is homogenization under the following conditions: pressure 5000 to 15000 psig; 1 to 5 passes through the homogenizer; temperature 32°F. to 122°F.; pH 4.5 to 7.5. The ruptured yeast cell system (homogenate) may be diluted, warmed, and pH adjusted to favor processability and nuclease and protein extractability.

In our process, the homogenate is adjusted to a pH of above 5.5 (preferably between 8 and 11) and maintained at this pH for 5 to 60 minutes at a temperature of 40°F. to 140°F. This step extracts the nuclease, protein and other cytoplasmic materials. The homogenate then is separated by centrifugation and/or filtration into a cell wall residue and an extract, usually referred to as the alkaline extract. The development of a yeast glycan from the cell wall residue is described in copending patent application Ser. No. 310,452.

If the majority of the protein (which we call yeast protein isolate or IYP) is recovered by isoelectric precipitation at this stage, the protein will then contain the majority of the nucleic acid, and the remaining solubles (yeast extract) will be deficient in nucleic acids. Therefore, the objective is to solubilize the nucleic acid to the extent that it does not accompany the majority of the protein. The nucleic acid will then remain in the solubles, which we call the yeast extract. Either chemical or enzymatic means can be used to solubilize the nucleic acid. The chemical methods are described in application Ser. No. 310,453 and involve the use of highly alkaline solutions (pH 9.5 to pH 12.5) at temperatures of 50°C. to 120°C. for less than 4 hours. Chemical methods effectively solubilize the nucleic acid and allow the recovery of a protein fraction high in protein and low in nucleic acid content, and a yeast extract fraction which is high in nucleic acid content. However, the use of such conditions tends to produce off-flavors in the protein and in the yeast extract, to increase ash content in the yeast extract, and to decrease nutritive quality of the protein fraction.

An enzymatic process is preferred. The enzyme that solubilizes nucleic acid is called nuclease. The nuclease can be provided by the yeast itself or from an external source. Nuclease provided by the yeast itself is called endogenous nuclease. This process is described in Ser. No. 310,469. An external source of nuclease is called exogenous nuclease, and such process is described in Ser. No. 310,468. Utilization of the endogenous nuclease is preferred for economy, ease of processing, and flavor.

If the previously described alkaline extract is prepared in accordance with the described procedure, the nuclease is not destroyed.

To employ the endogenous nuclease, the alkaline extract is brought to pH 5 to 8, 40° to 60°C., and incubated for a time of 15 to 20 minutes. The majority of the protein becomes insoluble and is recovered by centrifugation or filtration. The majority of the nucleic acid remains soluble and is contained in the yeast extract.

The product of this invention is the cell free extract and contains the following composition on a dry solids basis: about 40% to about 55% crude protein (N × 6.25); about 7% to about 14% nucleic acid; about 0.5% to about 1.5% to about 17% to about 27% ash; and about 10% to about 35% carbohydrate.

On a moisture free and ash free basis the composition is as follows: 52% to 71% crude protein; 9% to 18% nucleic acid; 0.7% to 2% lipid; and 15% to 45% carbohydrate. We have converted this to an ash free basis because it may be desirable to dilute the composition with salt (ash) for certain purposes. This can be done without affecting the desirable characteristics of the product.

The crude protein is calculated from the Kjeldahl Nitrogen method, considering that the crude protein contains 16.0% nitrogen. The total nitrogen is measured and multiplied by a factor of 6.25.

The nucleic acid (which we call RNA) is determined by the following method:

RNA DETERMINATION:

The RNA is determined essentially by the method of Uziel et al [Anal. Biochem. (1968), 25, 77–98]. The polynucleotide in the sample (which may contain polynucleotides having a range of molecular weights, mononucleotides, nucleosides and nitrogen bases) is digested to mononucleotides with alkali. This material is called the alkali digest.

A portion of the alkali digest is treated with alkaline phosphatase to degrade the nucleotides to nucleosides. The alkali digest contains nucleotides, nucleosides and nitrogen bases, but the enzyme treated alkali digest contains only nucleosides and nitrogen bases. The nucleosides and nitrogen bases in the two digests are separated by cation exchange chromatography. The separated components are quantitated by comparison of the peak areas with that of standards separated and measured under the same conditions.

Calculations are made as follows:

| Compound | n Moles per mg. Sample Solids | |
|---|---|---|
| | Alkali Digest Plus Alkaline Phosphatase Digest | Alkali Digest |
| Nucleoside A | X | Y |
| Nitrogen Base B | Z | Z |

The difference X−Y gives $n$ moles of nucleotide per mg. sample contained in the alkali digest; Y represents preformed nucleoside in the sample. The number Z is the same for both digests and represents $n$ moles of nitrogen base per mg. of sample.

The molar quantities of nucleotide A, nucleoside A, and nitrogen base B are multiplied by their respective molecular weights to give the weight of nucleotide, nucleoside, or nitrogen base per unit weight of sample solids.

The total nucleic acid content of a sample is the sum of the weight of nucleotides, nucleosides and nitrogen bases per unit weight of sample.

The nucleic acid is considered to contain 16.3% nitrogen. Therefore, the RNA content divided by 6.13 gives the nitrogen content of the nucleic acid.

CORRECTED PROTEIN

RNA contributes to the crude protein content of a sample. The true or corrected protein content is obtained by subtracting the nitrogen contributed by the nucleic acid from the total nitrogen, and multiplying by 6.25, that is:

% Corrected Protein = 6.25 (% Total Nitrogen—% RNA Nitrogen)

Broadly, the process of this invention embodies the steps of rupturing the yeast cell walls; extracting the cytoplasmic constituents; separating the cell wall debris and alkaline extract; treating the alkaline extract to solubilize nucleic acid; and separating the insoluble protein from the soluble yeast extract.

Cell rupture, extraction of solubles, and processability are affected by pH, temperature, time, solids concentration, and homogenizer efficiency. Our usual method of measuring the extent of cell rupture is to determine the amount of nitrogen that remains soluble as follows:

$$\% \text{ N Extractability} = 100 \times \frac{\text{g N in supernate after centrifugation}}{\text{g N homogenate before centrifugation}}$$

PREFERRED PROCESS

The yeast biomass after washing has a pH of about 4.5–7.5. The biomass is usually chilled, then passed through a Manton-Gaulin homogenizer to a chilled receiver. The process is repeated for at least three passes. At least three passes are needed to obtain maximum cell rupture. In practice, the biomass is homogenized at the ambient pH of the yeast namely, 4.5–7.5. Cell rupture can also be achieved at higher pH's up to at least pH 9.5 but the subsequent separation of the cell wall residue from the solubles becomes more difficult.

The effects of pH, solids concentration, and homogenizer efficiency upon the nitrogen extractability of *Candida utilis* and on *Saccharomyces cerevisiae* are shown in Tables 1 and Table 11.

With *Candida utilis* and *Saccharomyces cerevisiae*, each pass from 1 to 5 through the homogenizer improves the nitrogen extractability, presumably by rupturing more cells. A three pass system has been adopted as a good balance between efficiency of processing and cost. The pressure is between 5000 and 15000 psig.

The data of Tables I and II show that extraction of the soluble nitrogenous materials can be carried out at least over the pH range of about 5.5 to about 11. Process considerations further limit the extraction pH to the range of about 7 to about 10, with a pH of 9.5 considered the optimal balance between efficiency of extraction and efficiency of subsequent separation of the cell wall residue from the solubles. Furthermore, the nuclease is inactive at a pH of 9.5 which means that nuclease is carried along in the process to the point at which its activity is desired. Extraction is best at a low solids content, but again a consideration of process rates led to the adoption of a solids content of about 2.5 to about 4%. Extraction time can be varied between about 5 and about 60 minutes at extraction temperatures of about 0°C. to about 60°C. preferably 25–60°C. The best process rates for the subsequent separation of the cell wall residue from the solubles are obtained when the extraction is done at 60°C. for 5 to 20 minutes, at pH 9.5.

However, temperatures greater than 50°C. rapidly inactivate the endogenous nuclease activity at pH 9.5, but holding for 5 minutes at 50°C. can be tolerated, and results in a greater yield of protein and a better separation of cell walls from the alkaline extract. A five minute warming period is practical on a large scale. A termperature of 25°C. is advisable if the time and higher temperature cannot be tightly controlled.

A temperature slightly above freezing is also practical to help control bacterial contamination if the process rate is slow. A temperature of higher than 60°C. is to be avoided if the endogenous nuclease is to be used to solubilize the nucleic acid.

TABLE I

Effect of Extraction pH, Solids Level, and Homogenizer Efficiency Upon Nitrogen Extractability of *Candida utilis*

Chilled suspensions of *Candida utilis* at pH 5.0–5.5, 7–10% solids were homogenized by means of Manton-Gaulin homogenizer. The chilled homogenate was recycled through the homogenizer repeatedly to give one, two, three or four pass homogenate. The homogenate was diluted with up to 2.0 parts of water, and adjusted in pH. The diluted homogenates were incubated for 30 min. at 50°C. and then centrifuged. The nitrogen contents of the diluted homogenate, and of the supernate were measured by the Kjeldahl method. % N extractions were calculated.

| pH of Extraction | Solids Content | No. of Passes | % Nitrogen Extracted |
|---|---|---|---|
| 7    | 2.5 | 3 | 76*  |
| 8    | 2.5 | 3 | 74*  |
| 9    | 2.5 | 3 | 84*  |
| 10   | 2.5 | 3 | 82** |
| 11   | 2.5 | 3 | 80** |
| 9.5  | 2.5 | 1 | 70*  |
| 9.5  | 2.5 | 2 | 83*  |
| 9.5  | 2.4 | 3 | 89*  |
| 9.5  | 2.5 | 4 | 91*  |
| 9    | 2.4 | 3 | 83*  |
| 10   | 2.4 | 3 | 82** |
| 11   | 2.4 | 3 | 78** |
| 12   | 2.4 | 3 | 85** |
| 9    | 6.9 | 3 | 64** |
| 10   | 6.9 | 3 | 59***|
| 11   | 6.9 | 3 | 54***|
| 12   | 6.9 | 3 | 41***|

Good (*), Medium (), or Poor (*) separation of cell wall residue and solubles.

TABLE II

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized by means of a Manton-Gaulin homogenizer. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH | % Solids Content | Time (min.) | °C. Temp. | Number of Passes | % Nitrogen Extract- ability |
|---|---|---|---|---|---|
| 9.5 | 9.1 | 30 | 25 | 3 | 83 |
| 9.5 | 4.8 | 30 | 25 | 3 | 84 |
| 9.5 | 3.1 | 30 | 25 | 3 | 92 |
| 9.5 | 3.1 | 30 | 25 | 2 | 80 |
| 9.5 | 3.1 | 30 | 25 | 1 | 63 |
| 9.5 | 3–4 | 5  | 50 | 3 | 91 |
| 9.5 | 3–4 | 20 | 50 | 3 | 93 |
| 9.5 | 3–4 | 30 | 50 | 3 | 96 |
| 9.5 | 3–4 | 60 | 50 | 3 | 96 |
| 9.5 | 3–4 | 5  | 60 | 3 | 93 |
| 9.5 | 3–4 | 20 | 60 | 3 | 94 |
| 9.5 | 3–4 | 30 | 60 | 3 | 91 |
| 9.5 | 3–4 | 60 | 60 | 3 | 90 |
| 4.0 | 3–4 | 30 | 25 | 3 | 33 |
| 5.0 | 3–4 | 30 | 25 | 3 | 36 |
| 6.0 | 3–4 | 30 | 25 | 3 | 79 |
| 7.0 | 3–4 | 30 | 25 | 3 | 93 |
| 8.5 | 3–4 | 30 | 25 | 3 | 93 |
| 9.5 | 3–4 | 30 | 25 | 3 | 96 |
| 6.0 | 3–4 | 60 | 60 | 3 | 42 |
| 6.5 | 3–4 | 60 | 60 | 3 | 33 |
| 7.5 | 3–4 | 60 | 60 | 3 | 30 |
| 8.5 | 3–4 | 60 | 60 | 3 | 73 |
| 9.5 | 3–4 | 60 | 60 | 3 | 90 |

Centrifugation or filtration of the treated homogenate yields the cell wall residue and the soluble cytoplasmic materials which we call the alkaline extract. The alkaline extract is treated to insolubilize the majority of the protein with the concomitant retention of solubility of the nucleic acid. This can be accomplished using endogenous nuclease in accordance with the process described in our co-pending application Ser. No. 310,469, or using an exogenous nuclease in accordance with the process described in our co-pending application Ser. No. 310,468, or using alkali in accordance with the process described in our co-pending application Ser. No. 310,453. The preferred process utilizes the endogenous nuclease.

The parameters affecting the endogenous nuclease activity are sharply defined. Adjustment of the alkaline extract to pH 6, followed by incubation at pH 6, causes the greatest nuclease activity as evidenced by the lowest content of RNA in the yeast protein fraction.

The increase or decrease of even one pH unit markedly increases the RNA content of the yeast protein fraction. A pH between about 5 and about 7 is workable. Greater nuclease activity in the yeast selected would increase the pH range. At values less than pH 5, isoelectric precipitation of the nucleoprotein occurs which is undesirable until the nucleic acid has all been hydrolyzed. The optimum temperature of an enzyme reaction is that temperature at which the proper balance of activation and inactivation is achieved. The nuclease is more active at 60°C. than at 50°C., but inactivation is also greater, with the end result being an increased level of RNA in the yeast protein fraction with the 60°C. incubation temperature. Temperatures lower than 50°C. cause a slower rate of reaction. Greater nuclease activity in the yeast broadens the temperature range. The length of incubation (time) is adjusted to attain the desired level of RNA in the yeast protein fraction. The incubation time is limited by the fact that the 50°C., pH 6 conditions are compatible with bacterial growth. Therefore, the shorter the incubation time, the greater the control of bacterial contamination. Maximizing nuclease activity is a benefit to economy of processing and to control of bacterial contamination.

Removal of the sludge at 70°C. improves the yield, if the optimum conditions of nuclease extraction and utilization are used. An additional benefit of the 70°C. temperature is derived from a "pasteurization" effect at this temperature.

As previously mentioned, as the nuclease content of the cells is increased by genetic or environmental manipulation, a wider latitude in operating conditions can be tolerated. Also, the greater the RNA content in the finished yeast protein, the greater is the toleration in the operating parameters.

If, for any reason, the nuclease has not reacted completely, then part of the nucleic acid remains with the insoluble protein, and is not found in the yeast extract. The data shown in Table III on the effect of the duration of the nuclease reaction shows that sufficient time must be allowed for the nuclease to act in order to have the majority of the nucleic acid appear in the yeast extract.

TABLE III

The Effect of Nuclease Reaction Time on The Nucleic Acid Content

An alkaline extract containing 3.4% total solids at pH 9.4 was adjusted to pH 6 with hydrochloric acid and incubated at 50°C. Samples were removed periodically, adjusted to pH 4.5 and centrifuged. The insoluble protein residue (IYP) and the supernate (yeast extract) were freeze-dried and analyzed for nucleic acid content.

| Incubation Time (min.) | | 0 | 15 | 30 | 45 | 60 |
|---|---|---|---|---|---|---|
| % Nucleic Acid (dsb) | Yeast Extract | 1.0 | 4.7 | 7.0 | 7.1 | 6.2 |
| | IYP | 12.0 | 6.1 | 1.9 | 1.3 | 0.8 |

The following are detailed examples of this invention:

EXAMPLE 1

Preparation of Extract from *Saccharomyces cerevisiae*

Commercial baker's yeast was used as a source of *Saccharomyces Cerevisiae*. The biomass was given three water washes and thickened by centrifugation to 11% solids by weight.

Fifty gallons of this suspension containing 45 pounds of yeast solids were cooled to 45°F. and homogenized at a pressure of 8000 psig and immediately cooled to 45°F. The homogenization was repeated for a total of three passes. The homogenate was diluted to a volume of 150 gallons with water, and a food grade alkaline reagent, sodium hydroxide, was added until pH 9.5 was reached. About 1.7 liters of 10 N.NaOH were required for this. The material was agitated for 15 minutes and then centrifuged. The insoluble cell wall residue (yeast glycan) was removed. From 43 lbs. of homogenate solids, we recovered 27.5 pounds of alkali extract solids and 16.9 pounds of crude yeast glycan insolubles. The additional material was the NaOH added to adjust the pH.

The alkali extract fraction then was adjusted to pH 6.0 by the addition of 15 liters of 1N. hydrochloric acid, warmed to 122°F., and held with mild agitation for one hour at pH 6.0 to allow the endogenous nuclease to digest the nucleic acid. At the end of the incubation, 37.5 grams of calcium chloride were added. The protein suspension was warmed to 175°F. and centrifuged to yield the protein sludge (14.5 pounds dry solids) and the acid whey (11.5 pounds dry solids).

The ninety gallons of acid whey solubles containing about 1.5% dry solids were concentrated to 5.4 gallons containing 25% solids by momentarily heating to 190°F. and flash cooling to 140°F. The acid whey was recycled until a liquid concentrate containing about 25% solids content was obtained. The composition of the liquid concentrate (dsb) was 45.1% crude protein, 10.0% nucleic acid, 25.9% ash, 0.3% lipid, and 28.7% carbohydrate. The glutamic acid residues comprised 34% of the corrected protein in the extract.

EXAMPLE 2

Preparation of Extract from *Saccharomyces cerevisiae*

1000 grams of commercial baker's yeast cream (*Saccharomyces cerevisiae*) at pH 5.9 and containing 9% solids was homogenized by three successive passes through a Manton-Gaulin homogenizer at 8000 psiq. The homogenate was diluted with water to 3.4% solids, adjusted to pH 9.5 with 8.5 ml. 10 N. NaOH, rapidly brought to 50°C., held for 5 minutes, and centrifuged at 13,200 rcf × g. The supernate was adjusted to pH 6 with 15 ml. of 4 N. HCl and incubated at 50C. for 90 minutes. The temperature was then rapidly increased from 50°C. to 70°C. and held at 70°C. for 5 minutes, followed by centrifugation to separate the insoluble protein sludge from the acid whey solubles. The acid whey solubles were concentrated in vacuo by means of a thin film rotary evaporator at a sample temperature of 40°C. to a liquid concentrate containing 51.9% crude protein and 9.4% nucleic acid on a dry solids basis.

EXAMPLE 3

Preparation of Extract from *Saccharomyces cerevisiae*

Commercial baker's yeast cream of pH 5.9 and containing 9% solids was homogenized by three successive passes through a Manton-Gaulin homogenizer at 8000 psig. The homogenate was diluted with water to 3.4% solids, adjusted to pH 9.5, heated at 60°C. for 10 minutes, and centrifuged at 14000 rcf × g. into a cell wall residue fraction and an alkaline extract fraction. The alkaline extract contained 79.1% of the solids and 92.2% of the crude protein that was present in the starting yeast.

Malt sprouts were used as a source of exogenous nuclease. The malt sprout nuclease was prepared by blending washed malt sprouts for 5 minutes with twenty volumes of water. The blended material was filtered through cheesecloth and centrifuged to a sparkle extract. An extract prepared in this manner contains about 64 nuclease units per ml.

To 200 ml. of alkaline extract containing 5.8 grams of solids, including 3.92 grams of crude protein and 0.55 grams nucleic acid, was added 100 ml. of malt sprouts extract and 1.15 ml. of 4 N. HCl to give a pH of 7. The 300 ml. were incubated for 1 hour at 50°C. and a pH of 6. The pH then was adjusted to 4.5 with 1.3 ml. 4 N. HCl. The insoluble protein was removed by centrifugation at 14,000 rcf × g. The remaining solubles fraction is the acid whey, which is also called "yeast extract".

The yield of extract amounted to 38.3 pounds of solids per 100 lbs. of starting yeast. The yeast extract contained, on a dry solids basis (dsb), 44.8% crude protein and 10.3% nucleic acid

EXAMPLE 4

Preparation of Extract from *Candida utilis*

*Candida utilis* biomass was produced by fermentation upon a molasses substrate supplemented with a source of nitrogen and phosphate. The biomass was harvested by centrifugation and washed three times with water. The biomass contained 7.8% solids.

83 gallons of this suspension containing 53 pounds of yeast solids were cooled to 45°F., homogenized at a pressure of 8000 psig, and immediately cooled to 45°F. The homogenization was repeated. The homogenate was diluted with about two parts of water to 218 gallons, and a food grade alkaline reagent, sodium hydroxide, was added until pH 9.6 was reached. About 2.2 liters of 10 N. NaOH were required. The material was agitated for 1 hour at 45°F., and then centrifuged to obtain the cell wall residue and 170 gallons of alkaline extract. The alkaline extract contained 80% of the nitrogen present in the homogenate.

Malt sprouts were used as a source of exogenous nuclease. Comminuted malt sprouts were extracted with water by stirring 47 pounds of comminuted malt sprouts in 85 gallons of water for 1 hour at 122°–124°F. The insoluble solids were removed by screening to obtain fifty gallons of malt sprout extract.

Forty gallons of malt sprouts extract at pH 5.9 were added to 94 gallons of alkaline extract at pH 9.6. The resulting pH was 7.0. The temperature of the mixture was increased to 122°F. and held for 1 hour with agitation. The mixture was cooled to 86°F. and adjusted to pH 4.5 by the addition of hydrochloric acid. The insoluble protein was removed by centrifugation. 105 gallons of acid whey (yeast extract) containing 12.7 pounds of solids were obtained. The composition of the extract (dsb) is 48% crude protein, 7.2% nucleic acid, and 15.8% ash.

EXAMPLE 5

Preparation of Extract from *Candida utilis*

Alkaline extract was prepared in the same manner as described in Example 4. The alkali extract was adjusted to 0.025 N. NaoH (about pH 10) and heated for 3 hours at 175°–180°F. The pH was adjusted to 4.5 by the addition of phosphoric acid. The mixture was centrifuged to obtain the extract and the insoluble protein. 11.5 pounds of extract solids were obtained per 62.4 pounds of starting yeast solids. The extract composition (dsb) was 32.8% crude protein, 8.5% nucleic acid, and 42.0% ash. The glutamic acid residues were 21 grams per 100 grams of corrected protein.

EXAMPLE 6

Preparation of Extract from *Saccharomyces cerevisiae*

Alkali extract was prepared in the manner described in Example 1. The alkali extract was adjusted to 0.025 N. NaOH (about pH 10) and heated for 3 hours at 175°–180°F. The pH was adjusted to 4.5 by the addition of phosphoric acid. The mixture was centrifuged to obtain the extract and the insoluble protein. The extract contained 37.8% crude protein, 6.8% nucleic acid, and 38.1% ash, on a dry solids basis.

This process is applicable to any yeast in which (1) the outer boundary or cell wall can be fractured or made porous in some manner, and (2) the primary protein components of low nucleic acid content can be recovered either separately or together with the cell wall debris.

The product obtained by our process is clearly differentiated by its nucleic acid and glutamic acid residues content from the commercially available extracts of yeast. This difference is clearly shown by expressing the nucleic acid content on an ash-free basis. The results of the examination of four commercial yeast extracts and of our extract prepared from *Saccharomyces cerevisiae* and *Candida utilis* are shown in Table IV.

TABLE IV

| (dsb): | Our Process Composition of Yeast Extracts | | | | | Commercial Yeast Extracts | | | |
| | Bakers | | | C. Utilis | | | | | |
| | Endog.[1] | Exog. | Chem. | Exog. | Chem. | A | B | C | D |
|---|---|---|---|---|---|---|---|---|---|
| % Crude Protein | 47.0 | 44.8 | 37.8 | 48.0 | 32.8 | 37.4 | 43.9 | 50.8 | 56.6 |
| % RNA | 10.5 | 10.3 | 6.8 | 7.2 | 8.5 | 1.7 | 2.7 | 2.2 | 5.7 |

TABLE IV —Continued

| (dsb): | Our Process Composition of Yeast Extracts | | | | | Commercial Yeast Extracts | | | |
|---|---|---|---|---|---|---|---|---|---|
| | Bakers | | | C. Utilis | | | | | |
| | Endog.[1] | Exog. | Chem. | Exog. | Chem. | A | B | C | D |
| % Corrected Protein | 36.4 | 34.3 | 30.9 | 40.6 | 24.1 | 35.8 | 41.2 | 48.6 | 51.0 |
| % Ash | 22.4 | | 38.1 | 15.8 | 42.0 | 42.6 | 19.4 | 21.2 | 19.1 |
| MOISTURE and ASH FREE: | | | | | | | | | |
| % Crude Protein | 60.6 | | 61.2 | 57.0 | 56.5 | 65.0 | 54.5 | 64.5 | 70.0 |
| % RNA | 13.5 | | 10.9 | 8.8 | 14.7 | 3.0 | 3.3 | 2.8 | 7.0 |
| % Corrected Protein | 46.9 | | 50.1 | 48.1 | 41.5 | 62.5 | 51.1 | 61.6 | 58.0 |
| g. NUCLEIC ACID PER 100g. Crude Protein | 22.3 | 23.0 | 18.0 | 25 | 26.0 | 2.9 | 6.2 | 4.3 | 10.0 |
| g. GLUTAMIC ACID RESIDUE PER 100 g. Corrected Protein | 34 | | | 21 | | 13 | 14 | 11 | 17 |

[1] The average of 22 samples was (dsb): 47.0 ± 4.5% crude protein, 10.5 ± 1.9% nucleic acid, and 22.4 ± 4.0% ash.

The yeast extract or acid whey is obtained as a dilute stream. The conditions of concentration of the solids determine the organoleptic character of the concentrate. The dilute yeast extract is concentrated by momentary heating and flash cooling as described in Example 1. The liquid concentrate prepared in such a manner and containing at least about 25% solids has a flavor that is characterzed as "buttery-fatty", and a tactual sensation of "mouthfullness", and "salivation". By mouthfullness is meant that sensation of apparent viscosity throughout the entire oral cavity. By salivation is meant a mouth watering effect. These are desirable characteristics. This liquid concentrate is called the neutral flavored extract.

We prefer to concentrate to at least about 70% solids for a commercial extract because the product has a longer storage life at higher solids levels.

Cooking of the neutral extract under the proper conditions causes the development of a flavor profile primarily characterized as roast meaty and salty, with lesser amounts of burnt protein, sour, serumy, and astringency, all of which are complementary to produce a well-rounded flavor. The mouthfullness and salivating effects are retained. Flavors such as cooked vegetable and starchy are notably absent.

To obtain the roast meat flavor, the neutral extract of at least 25% and preferably 40–60% solids is adjusted to pH 3 to pH 7, preferably pH 5.5–6.5, and heated to 80°–100°C., for 2 to 16 hours, preferably 8–10 hours. This comprises the cooking step to provide the cooked liquid concentrate. The cooked liquid concentrate is further concentrated by repeated cycles of momentary heating and flash cooling until the solids content is at least about 70%, at which concentration the water activity (Aw) is sufficient to provide excellent storage conditions.

The conditions employed during the cooking step are carefully balanced to retain the mouthfullness and salivating effects, to develop the roast meat flavor, and to avoid the development of undesirable flavors. Undercooking, such as employing less than the preferred temperature, or at less than the preferred solids, or for less than the preferred time does not develop the maximum meaty flavor, but does not destroy the mouthfullness or salivating effects.

Overcooking, such as employing higher than the preferred temperature or for a prolonged time, causes a decrease in the meaty flavor and an appearance of an undesirable flavor characterized as burnt hair. Furthermore, overcooking causes a decrease in the mouthfullness and salivating sensations. The lack of mouthfullness and salivating sensations is usually noted as a flat character in contrast to a well-rounded system.

Cooking at lower than the preferred pH introduces a sourness that interferes with meat identity. Cooking at greater than the preferred pH introduces burnt hair character.

A natural use for the yeast extract is a source of meat flavor and/or flavor supplement to meat broth in sauces and gravies.

Following are examples of methods of making the meat flavor extract from the neutral flavor extract and of using both the neutral flavor extract and the meat flavor extract in food products.

EXAMPLE 7

A liquid neutral tasting extract of baker's yeast solubles at pH 6.0 containing 41% solids on a weight basis and comprising on a dry solids basis 47.8% crude protein, 11.5% nucleic acids, 22.1% ash, less than 1% lipids, and about 30% carbohydrate, was transferred to a stirred pot and adjusted to pH 5.0 by the addition of hydrochloric acid. The pot and its contents were set in a 125°C. oil bath which provides a sample temperature of 90°–95°C. The sample was stirred for 8 hours. The volume was reduced by evaporation until the solids content was 60% on a weight basis and maintained at 60% by the periodic addition of water.

The cooked sample was diluted with an equal volume of water. The diluted sample was reduced in volume to 60% solids by the in vacuo concentration at 60°C. in a rotary thin film evaporator. The proximate composition of the cooked sample on a dry solids basis is the same as the composition of the neutral tasting extract.

The flavor of a dilute solution was evaluated by a trained taste panel. The predominant flavor was roast meat.

EXAMPLE 8
SAVORY BOUILLON OR SOUP BASE (MEATLESS)

| Ingredients | % |
|---|---|
| Water | 95.0 |
| Baker's Yeast Extract (meat flavored) | 2.5 |
| *Seasoning Mix | 2.5 |
| | 100.0 |

| *Seasoning Mix Ingredients | % |
|---|---|
| Salt | 40.0 |
| Dextrose | 40.0 |
| MSG | 10.0 |
| Pre-gelatinized Starch | 5.5 |
| Onion Powder | 3.0 |
| Caramel Color | 1.0 |
| Celery Salt | 0.5 |
| | 100.0 |

Preparation: (Bouillon)
1. Blend ingredients in a suitable utensil.
2. Bring to slow boil over a low flame, with occasional stirring.

For Use as a Soup Base:
1. Add 100 grams (3⅛ oz.) of canned, mixed vegetables (drained) to each cup of bouillon base prepared as above.
2. Heat and serve.

The baker's yeast extract was produced by the process of Example 7.

EXAMPLE 9
BROWN SAUCE (BEEF)

| Ingredients | % |
|---|---|
| Pre-gelatinized Starch, 6% solution | 86.7 |
| Boiled Beef Stock (5% solids) | 10.0 |
| Baker's Yeast Extract (meat flavored) | 2.5 |
| Salt | 0.5 |
| Caramel Color | 0.3 |
| | 100.0 |

Preparation:
1. Prepare starch solution.
2. Combine all ingredients.
3. Heat the sauce in a boiling water bath for 30 minutes.

The meat flavored yeast extract was produced from neutral flavored extract according to the process of Example 7.

EXAMPLE 10
BOUILLON OR SOUP BASE (BEEF)

| Ingredients | % |
|---|---|
| Water | 86.0 |
| Boiled Beef Stock (5% solids) | 10.0 |
| *Seasoning Mix | 2.5 |
| Baker's Yeast Extract (meat flavored) | 1.5 |
| | 100.0 |

| * Seasoning Mix Ingredients | % |
|---|---|
| Salt | 40.0 |
| Dextrose | 40.0 |
| MSG | 10.0 |
| Pre-galatinized Starch | 5.5 |
| Onion Powder | 3.0 |
| Caramel Color | 1.0 |
| Celergy Salt | 0.5 |
| | 100.0 |

Preparation: (Bouillon)
1. Blend ingredients in a suitable utensil.
2. Bring to a slow boil over a low flame, with occasional stirring.

For Use as a Soup Base:
1. Add 100 grams (3⅛ oz.) of canned mixed vegetables (drained) to each cup of bouillon base prepared as above.
2. Heat and serve.

The meat flavored yeast extract was produced from neutral flavored extract according to the process of Example 7.

EXAMPLE 11

Neutral flavored yeast extract is added to a commercial biscuit mix to produce a specialty biscuit which has a pronounced cheese-like flavor. The procedure is as follows:

A. Control Biscuit 250 grams Bisquick (prepared biscuit mix of General Mills) was combined with 113 ml. water and mixed 1 min. in a Model N-50 mixer using a paddle. The dough was rolled out ½ inch thick, cut, and baked for 8 min. at 450°F.

B. Adjunct Biscuit

The same procedure as "A" is used, except that 14 grams of neutral flavored yeast extract produced according to Example 1 at 53% solids is incorporated in the mix. The amount used is equivalent to about 7.5 grams of solids which in turn is equal to 3% based upon weight of the dry mix. The water is reduced by 7 ml.

The inclusion of the extract brought about a very pronounced flavor change compared to the control. A cheese-like aroma and taste was obtained which would characterize the product as a specialty biscuit.

What is claimed is:

1. An extract of yeast comprising a soluble fraction of yeast having a solids content of at least about 25% and which comprises on a moisture and ash free basis from about 52% to about 71% crude protein, about 9% to about 18% nucleic acid, about 15% to about 45% carbohydrate, about 0.7% to about 2% lipid, and which has a glutamic acid residues content which constitutes about 20% to about 45% of the corrected protein.

2. The extract of claim 1 having a solids content of at least about 70% by weight and having a neutral flavor.

3. The extract of claim 1 having a solids content of at least about 70% by weight and having a roast meat flavor.

4. A process for producing a yeast extract product comprising the steps of:
   a. rupturing yeast cells containing yeast protein,
   b. insolubilizing a majority of the protein and separating the remaining solubles fraction containing nucleic acid and other cytoplasmic materials from the insolubilized protein and the cell wall debris of the original yeast cells, said solubles fraction containing on a moisture free and ash free basis from about 52% to about 71% crude protein, from about 9% to about 18% nucleic acid, and a glutamic acid residue content which constitutes about 20% to about 45% of the corrected protein,
   c. concentrating said solubles fraction at least to a solids content of about 25% with a "buttery-fatty" character.

5. The process of claim 4 wherein the solubles fraction contains from about 15% to about 45% carbohydrate and from about 0.7% to about 2% lipid.

6. The method of claim 4 including the step of concentrating the solubles fraction to a solids content of at least about 70% by weight.

7. The method of claim 4 including the step of treating the concentrated solubles fraction at 80°–100°C. and pH 3–7 for 2–16 hours and recovering a product having a roast meat flavor.

8. The method of claim 7 including the step of concentrating the roast meat flavored extract product to at least 70% solids by weight.

9. A process for producing a yeast extract product comprising the steps of:
 a. rupturing yeast cells,
 b. separating a first solubles fraction containing nucleic acid, protein, and other cytoplasmic materials from an insoluble cell wall debris fraction,
 c. hydrolyzing the nucleic acid,
 d. insolubilizing a majority of the protein,
 e. separating a nucleic acid containing second solubles fraction from the insolubilized protein, said second solubles fraction containing on a moisture free and ash free basis from about 52% to about 71% crude protein, from about 9% to about 18% nucleic acid, and a glutamic acid residue content which constitutes about 20% to about 45% of the corrected protein, and
 f. concentrating said second solubles fraction at least to a solids content of about 25% with a "buttery-fatty" character.

10. The process of claim 9 wherein the concentrated solubles fraction is treated at pH of about 3 to about 7 and a temperature of about 80°C. to about 100°C. for about 2 to about 16 hours to produce an extract having a roast meat flavor.

11. The process of claim 10 wherein the roast meat flavored extract is recovered at a concentration of at least 70% solids by weight.

12. The process of claim 9 wherein the extract is concentrated at least to about 70% solids by weight and has a neutral flavor.

* * * * *